Aug. 20, 1957     W. L. BLACK     2,803,170
AIRCRAFT GUN TURRET
Filed Feb. 13, 1951     5 Sheets-Sheet 1
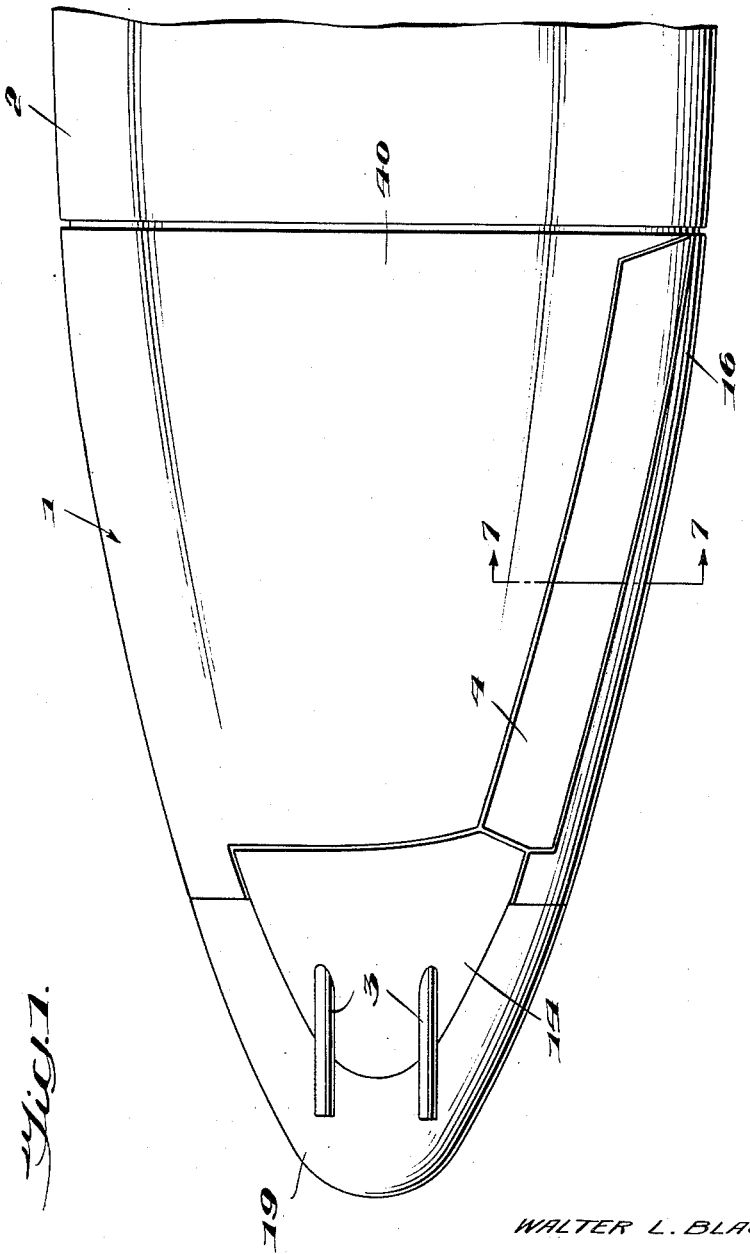
INVENTOR
WALTER L. BLACK,
BY
ATTORNEY

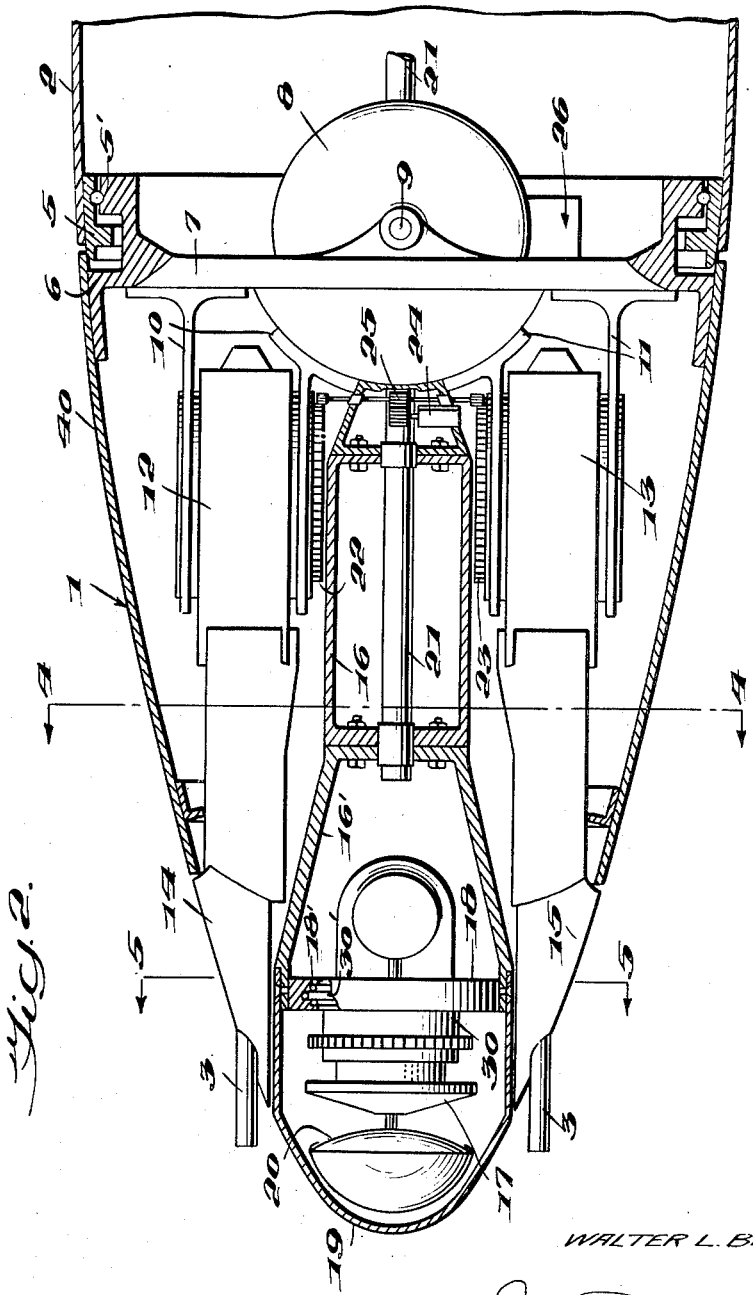

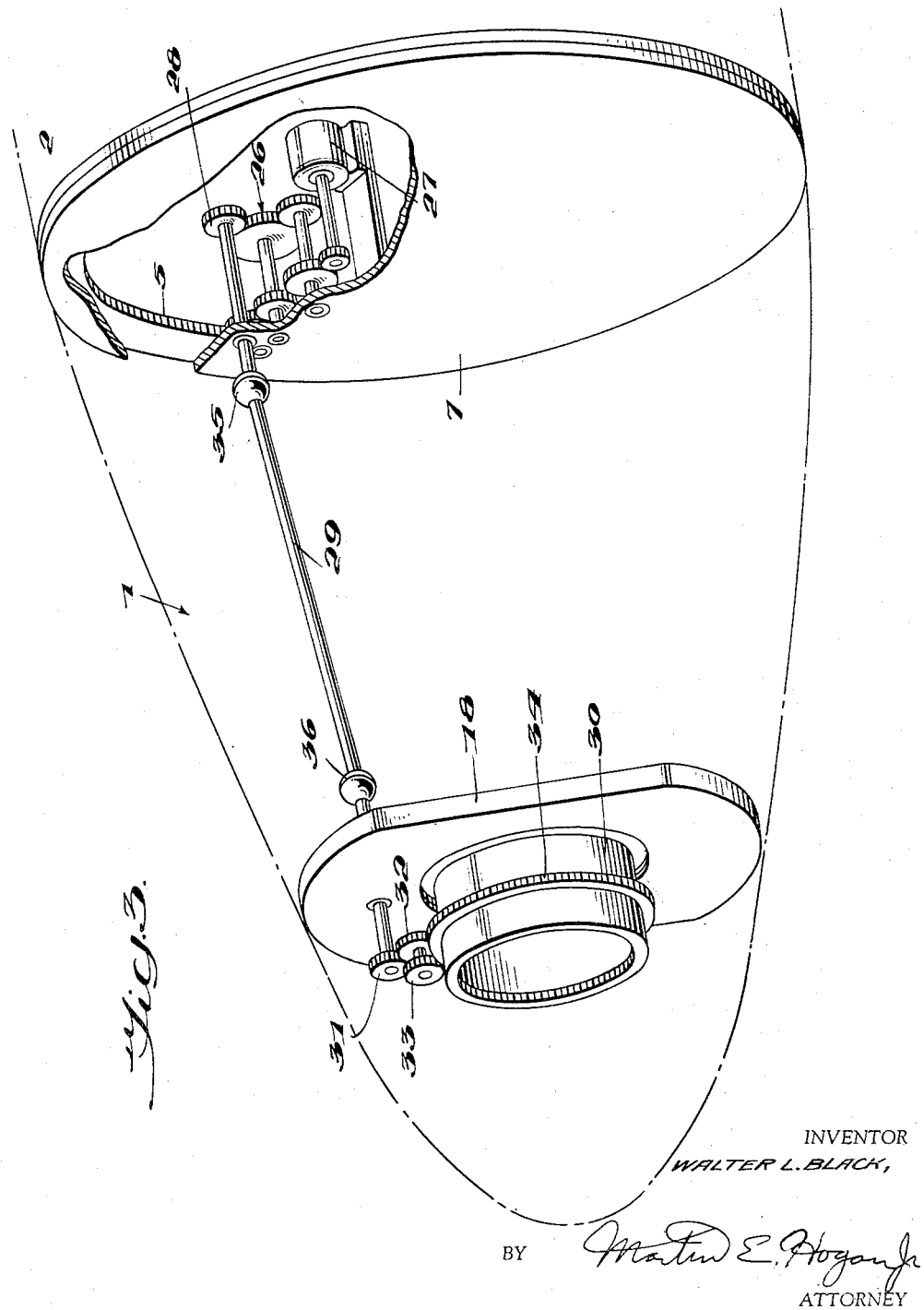

Aug. 20, 1957 W. L. BLACK 2,803,170
AIRCRAFT GUN TURRET
Filed Feb. 13, 1951 5 Sheets-Sheet 4
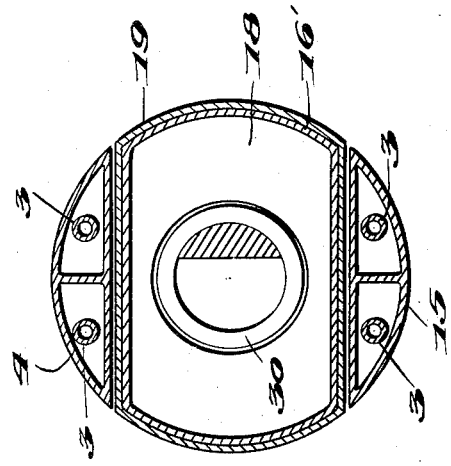
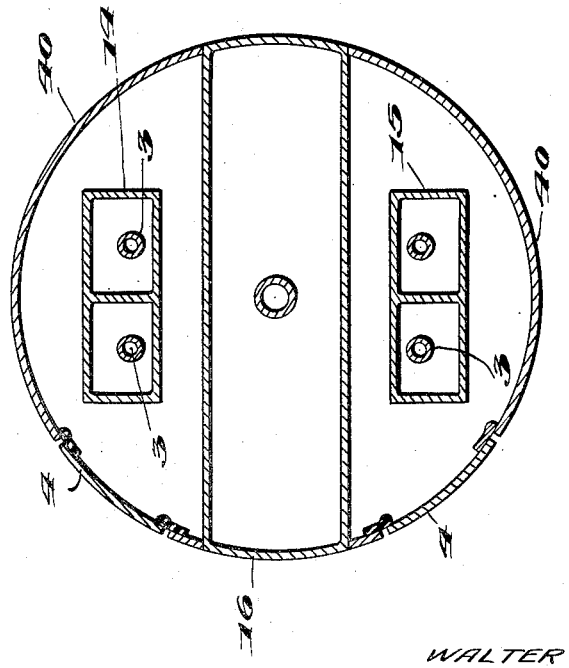
INVENTOR
WALTER L. BLACK,
BY *Martin E. Hogan Jr.*
ATTORNEY Aug. 20, 1957 W. L. BLACK 2,803,170
AIRCRAFT GUN TURRET
Filed Feb. 13, 1951 5 Sheets-Sheet 5
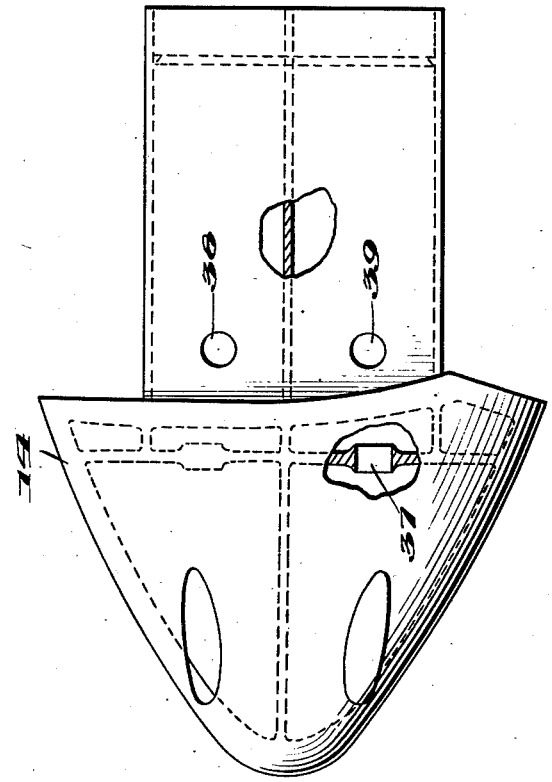
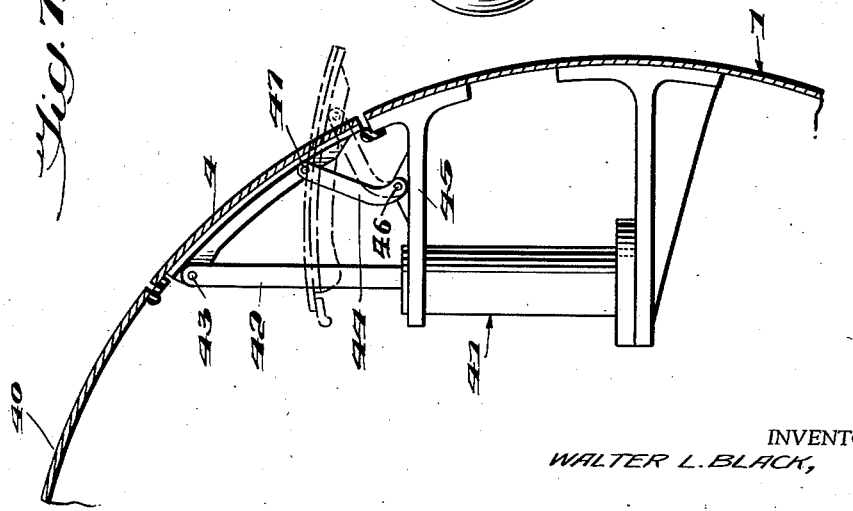
INVENTOR
WALTER L. BLACK,
BY Martin E. Hogan Jr.
ATTORNEY

United States Patent Office 2,803,170
Patented Aug. 20, 1957

2,803,170

AIRCRAFT GUN TURRET

Walter L. Black, Upper Falls, Md., assignor to The Glenn L. Martin Company, Middle River, Md., a corporation of Maryland Application February 13, 1951, Serial No. 210,780

6 Claims. (Cl. 89—37.5)

This invention relates generally to aircraft gun turrets and more specifically to a remote control type turret specially adapted to be mounted on an aircraft, forming the forward nose portion of the fuselage.

The increased operating speeds of modern military fighter aircraft has resulted in making fixed guns unsatisfactory as effective aircraft armament. The time between sighting the enemy and making the attack has become so short that orientation and aiming processes required for fixed gun equipment leave insufficient time for engaging the target.

By employing a rotatable nose turret with movable guns, fighter aircraft will be capable of making an attack from any approach, eliminating the maneuvering required for an attack with conventional fixed armament.

Rotatable gun turrets now used on bomber-type aircraft are not adaptable for use on the smaller and more maneuverable fighter types. A turret adapted to be carried forwardly of an aircraft and into the airstream requires a reasonably efficient aerodynamic shape which must blend with the fuselage to which it is attached. This is especially important on high speed aircraft where the effects of compressibility and drag are major factors. The conventional skin and girder construction normally employed is not adaptable to the more compact, streamlined turret.

High speed aircraft cannot successfully depend upon visual sighting means for locating targets, so obviously a device such as a radar sighting unit must be considered as an integral part of the modern fire control system. This necessitates the use of a radar signal transmitting scanner which must be located so as not to be directed towards the metal turret and aircraft structure. It logically follows then, that to search an area covered by the guns, the scanner is most effectively carried at the extreme forward end of the turret. This presents a problem in that to coordinate target position with respect to the aircraft, it is necessary to maintain the scanner axes fixed with respect to the aircraft. Since it is carried by the rotating turret, means must be provided which will prevent corresponding rotation of the scanner. Such a provision is among the features embodied in the turret of this invention.

An object of this invention is to provide an aircraft gun turret adapted to form the nose portion of the aircraft fuselage.

Another object of this invention is to provide a box-type construction for gun turrets which results in a lighter more compact unit than is realized from the conventional skin and girder construction.

Another object of this invention is to provide a turret having gun shrouds forming a part of the exterior turret configuration and protecting the gun barrels against deflections due to air drag.

Another object of this invention is to provide a rotatable turret having anti-roll means for accurately maintaining structure carried by the turret, fixed with respect to the turret mount.

Further and other objects will become apparent from the accompanying description and drawings which form a part of this disclosure and in which like numerals refer to like parts.

In the drawing:

Figure 1 is a top view of the turret of this invention shown mounted as the nose portion of an aircraft fuselage.

Figure 2 is a longitudinal sectional side view of the turret.

Figure 3 is a schematic drawing of the turret roll and anti-roll mechanism.

Figure 4 is a cross-sectional view of the turret taken approximately on line 4—4 of Figure 2.

Figure 5 is a cross-sectional view of the turret taken approximately on the line 5—5 of Figure 2.

Figure 6 is a top view of one gun shroud showing the detail construction features.

Figure 7 is a sectional view of the turret slot closure door and its operating mechanism taken approximately on line 7—7 of Figure 1.

The exterior configuration of turret 1 is shown in Figure 1 wherein the generally conically shaped turret is shown as carried forwardly of an aircraft 2, in co-axial alignment with and forming the nose portion of the fuselage. Guns 3 are shown in stowed position with slot closure door 4 covering the opening in the turret through which the guns are adapted to move during operation.

The detailed construction features of turret 1 are best shown in the sectional view identified as Figure 2. An internal ring gear and bearing support 5 is rigidly secured adjacent turret 1 to the fuselage of aircraft 2. Mounting ring 6 on turret 1 engages ring gear 5 through suitable bearings 5′ which transmit the forces developed in the turret to the aircraft structure. Transverse turret turntable 7 shown formed integral with mounting ring 6, though any rigid connection therewith is sufficient, is designed to absorb the loads developed in turret 1 and then transmit those loads to the aircraft supporting structure. An ammunition stowage drum 8 is rotatably carried by turntable 7 through pivot support 9. A pair of gun cradle supports 10 and 11 are fixedly connected to turntable 7 and extend forwardly therefrom in cantilever fashion to rotatably support gun cradles 12 and 13. Cradle supports 10 and 11 are arranged on turntable 7 so that the cradles will be symmetrically located on either side of the turret's longitudinal axis. Gun shrouds 14 and 15 are supported in cantilever fashion by gun cradles 12 and 13, extending forwardly of the turret gun cradles to complete the contours of the turret when in stowed position and protect the guns from airloads in other positions. Each cradle and gun shroud enclose a pair of guns 3 and provide support therefor.

A box structure 16 is carried from one end in cantilever fashion by turntable 7 and extends therefrom forwardly within the turret between the gun cradles and their supports. This box structure provides a space for retaining the cases and links ejected by guns 3. In addition to serving as a storage space, box 16 forms a portion of the envelope of the turret as indicated in Figure 4 and provides support for a sighting means specifically referred to as radar scanner assembly 17 through bulkhead 18 as shown in Figure 2. Bulkhead 18 is rigidly carried transversely of the turret axis by the forwardly extending portion 16′ of box structure 16. Scanner assembly 17 is carried by a mounting member 30 having a flange 30′ engaging suitable bearings 18′ in bulkhead 18 so as to be rotationally movable. A nose cone or radome 19 of dielectric material, carried by the forwardly extending portion 16′ of box structure 16, protects scanner assembly 17 from the airstream and provides a low drag fairing for the nose portion of the turret between the gun shrouds.

A tube 21 exends from adjacent scanner assembly 17 through bearing supports in box structure 16 and turntable 7 to provide a path through which electrical wiring may be run from the aircraft through the turret to scanner assembly 17. Tube 21, being located along the rotational axis of the turret and fixed with respect to the aircraft, prevents the wiring from being twisted by rotation of the turret.

Traverse gears 22 and 23 on gun cradles 12 and 13 are driven simultaneously and in unison by a traverse drive motor 24 through a suitable gear train 25 to swing the pairs of guns within planes generally parallel with each other and parallel with the turrets longitudinal roll axis.

Scanner assembly 17, carried in the forward portion of turret 1 and shielded from the airstream by the turret nose cone 19, must have axes established with respect to the aircraft and not with respect to the rotating turret. Therefore an anti-roll means is employed to maintain scanner assembly 17 fixed in position with respect to aircraft 2 at all times with minimum errors induced by turret deflections. This anti-roll means is shown schematically in Figure 3 in conjunction with the schematic showing of the turret roll drive mechanism. Gear train 26 carried by turntable 7 engages the teeth of internal ring gear 5 on aircraft 2 to provide unlimited rotation of the turret about its axis. Roll drive motor 27, also carried by turntable 7, provides power for operating gear train 26 to control the turret rotation. An anti-roll drive gear 28 engages gear train 26 to rotate a drive shaft 29. Drive shaft 29 extends through a bearing support in turntable 7 and through another bearing support in bulkhead 18. Gear 31 carried on drive shaft 29 engages gear 32 which drives gear 33. Gear 33 engages an external ring gear 34 on the rotatable mounting member 30 to fix its rotation with respect to aircraft 2. The gear reduction is such that the scanner rotates relative to the turret an equal amount and opposite in direction to the turret rotation. Universal joints 35 and 36 in drive shaft 29 are necessarily employed because the rotational force is not transmitted along a straight line axis parallel with the roll axis of the turret. Locating the anti-roll drive as far from the centerline of the turret as possible permits a large gear reduction between ring gear 34 on mounting member 30 and gear 31 on drive shaft 29 which reduces the torsional stresses and resulting deflections in the drive shaft to substantially prevent relative rotation between the scanner assembly and the aircraft due to inertia effects. Scanner assembly 17 is carried so that its rotational axis remains in one position irrespective of turret rotation. This condition is maintained by having the scanner rotational axis, the turret rotational axis and the aircraft longitudinal axis coincident with each other as is apparent in Figures 2 and 5.

Gun shrouds 14, shown in detail in Figure 6, provide bearing supports 37 for the front trunnion mounts of guns 3. This construction permits a greater distance between the rear trunnion mount and the front trunnion mount than is ordinarily possible, resulting in greater accuracy in aligning the guns. The rear trunnion mounts (not shown) are carried by the gun cradles as is usual. To allow the escape of gases produced by firing the guns, the shrouds are formed with hollow chambers having openings 38 and 39 adjacent each gun. The forward portion of the shrouds form a part of the exterior surface of the turret and protect the guns from airloads as hereinbefore stated.

To complete the envelope of the turret, a fairing structure 40 carried by turntable 7 encloses the portion of the turret outboard of the gun cradles. Fairing structure 40 includes slot closure doors 4 (one for each pair of guns), which open as shown in Figure 7 to permit the guns to swing in traverse, as previously described, by operation of actuating mechanism 41, and close when the guns are stowed to insure smooth airflow around the turret. Actuating mechanism 41 includes an axially movable piston rod 42, pinned at 43 to door 4. A link 44 is pinned at one end 46 to suitable supporting structure 45, and at its opposite end 47, to door 4. The location of the pivots are such that the door will open so as to minimize drag in the manner indicated in Figure 5 by actuation of rod 42.

After a target is selected and as turret operation begins, slot closure doors 4 are opened by mechanism 41 to permit the guns 3 to move in traverse through an arc up to 110° from the dead-ahead or 0° traverse position. The gun shrouds protect the barrels from the airstream and prevent deflections which would cause errors in aiming the guns. Roll drive motor 27 rolls the turret about its axis in cooperation with the traverse movement of the guns to aim to any point in the forward hemisphere. The anti-roll means, through tubular member 30, maintains scanner assembly 17 fixed with respect to the aircraft independently of turret rotation.

After the attack is made, the guns are swung back to their stowed position with the shrouds completing the contours of the turret. The slot closure doors are moved to cover the gun traverse openings and the roll drive mechanism returns the turret to the zero roll position.

The guns and supporting structure being symmetrically located about the axis of the turret, the recoil and air load forces are balanced to prevent buffeting and other adverse effects on the stability and control of the aircraft. Carrying the major components of the turret individually in cantilever fashion on the turret turntable and employing those components to complete the external configuration results in a compact and efficient structure especially adapted to withstand the large forces developed by the airstream during flight.

Though the turret is described as forming the nose portion of an aircraft fuselage, its basic construction is obviously equally well adaptable to other installations.

It is to be understood that certain changes, alterations, modifications and substitutions can be made without departing from the spirit and scope of the appended claims.

I claim as my invention:

1. In an aircraft, a gun turret mounted at one end on said aircraft for rotation relative thereto about a predetermined axis, a gun carried by said turret adjacent said one end for swinging motion in a plane generally parallel with said axis, drive means carried by said turret for rotating said turret and aiming said gun, a mounting member carried by said rotatable turret, spaced from said one end and mounted in said turret for rotation relative thereto, and anti-roll means carried by said turret for maintaining said mounting member fixed with respect to said aircraft irrespective of turret rotation.

2. In an aircraft, a gun turret including a turntable mounted for rotation relative to said aircraft about the turret axis, a gun carried by said turntable for swinging motion in a plane generally parallel with said axis, drive means carried by said turntable for rotating said turret and aiming said gun, a mounting member rotatably carried by said turntable, and anti-roll means carried by said turntable and operatively connected to said mounting member and to said drive means for maintaining said mounting member in fixed position relative to said aircraft irrespective of turret rotation.

3. A generally conically shaped aircraft gun turret forming the nose portion of an aircraft fuselage, the longitudinal axes of said turret and fuselage being generally co-axial, said turret being formed by three basic cantilever structures, said structures being supported by a turret turntable carried by said aircraft transversely of said axes for unlimited rotation, two of said cantilever structures comprising a pair of gun supporting means including gun shrouds mounted for swinging movement in planes parallel to said turret axis and symmetrically arranged on either side of said axis, said shrouds when in predetermined position forming part of the generally conical exterior surface of said turret, a pair of guns carried within each said gun shroud for swinging therewith, drive means for controlling the swinging movement of said guns and shrouds, the other of said cantilever structures comprising a box structure interposed between said gun supporting means and forming a part of the generally conical exterior surface of said turret, said box structure including a scanner mounting member rotatable relative thereto for supporting sighting means, said turret including roll drive means carried by said turntable and controlling the turret rotation, and anti-roll means driven by said roll drive means and extending to engage said mounting member whereby to maintain a fixed roll position of the latter with respect to said aircraft irrespective of turret rotation.

4. A generally conically shaped aircraft gun turret forming the nose portion of an aircraft fuselage and comprising a turntable supported for unlimited rotation about the longitudinal axis of said aircraft, gun supporting means carried by said turntable and extending generally parallel to said aircraft longitudinal axis, a plurality of guns symmetrically arranged on either side of said axis and mounted on said supporting means for swinging in unison in planes generally parallel with said axis, gun shrouds carried by said supporting means for swinging movement with said guns and forming a part of the generally conical exterior surface of said turret when in predetermined position, said shrouds partially enclosing said guns to prevent barrel deflections due to air drag, a box structure carried by said turntable and interposed between said guns for receiving ejected links and cases, said box structure forming a portion of the generally conical exterior shape of said turret, a scanner assembly rotatably supported by said box structure, drive means for controlling the movement of said turret and guns, and anti-roll means operated by said turret drive means for maintaining said scanner assembly fixed with respect to said aircraft irrespective of turret rotation.

5. A generally conically shaped aircraft machine gun turret forming the nose portion of an aircraft fuselage comprising a turntable rotatably supported by said aircraft, roll drive means for rotating said turntable, a pair of gun cradles swingably carried by said turntable and symmetrically spaced from its axis on opposite sides thereof, a pair of guns carried by each said cradle, traverse drive means associated with said cradles for swinging said guns in planes generally parallel with said axis, gun shrouds carried by said cradles and enveloping said guns, said shrouds forming a portion of the generally conical exterior surface of said turret when in one position and shielding said guns from air loads when in other positions, a scanner mounting member rotatably carried by the turret forwardly of said cradles and axially aligned with said turntable, and anti-roll means driven by said roll drive means for maintaining said scanner mounting member fixed with respect to said aircraft irrespective of turret rotation.

6. A generally conically shaped aircraft gun turret comprising a turntable, means for rotatably mounting said turntable on an aircraft, gun supporting means carried by said turntable, a plurality of guns carried by said gun supporting means and symmetrically arranged about the turret longitudinal axis, gun shrouds carried by said supporting means for shielding said guns and forming a portion of the generally conical exterior surface of said turret, said guns and shrouds being mounted for swinging in planes generally parallel with said turret longitudinal axis, a box structure interposed between said guns and carried by said turntable, said box structure forming the portion of the generally conical exterior surface of said turret between said guns, a sighting means mounting member rotatably carried by said box structure, drive means carried by said turntable for controlling said turret rotation and gun movement, and anti-roll means driven by said turret rotating drive means and engaging said sighting means mounting member to maintain the latter in a predetermined position irrespective of said turret rotation.

References Cited in the file of this patent
UNITED STATES PATENTS

| | | |
|---|---|---|
| 2,444,300 | Kuska | June 29, 1948 |
| 2,446,096 | Moore | July 27, 1948 |
| 2,448,704 | Fonseca | Sept. 7, 1948 |
| 2,454,806 | Kemmer et al. | Nov. 30, 1948 |
| 2,494,368 | Steele et al. | Jan. 10, 1950 |
| 2,598,231 | Davies | May 27, 1952 |